United States Patent
Sugimoto

(10) Patent No.: US 8,525,903 B2
(45) Date of Patent: *Sep. 3, 2013

(54) SYSTEM FOR AND METHOD OF TAKING IMAGE AND COMPUTER PROGRAM

(75) Inventor: Masahiko Sugimoto, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 216 days.

This patent is subject to a terminal disclaimer.

(21) Appl. No.: 13/118,789

(22) Filed: May 31, 2011

(65) Prior Publication Data

US 2011/0228136 A1    Sep. 22, 2011

Related U.S. Application Data

(62) Division of application No. 11/878,457, filed on Jul. 24, 2007.

(30) Foreign Application Priority Data

Jul. 25, 2006    (JP) .................. 2006-202427

(51) Int. Cl.
  *H04N 5/76* (2006.01)
  *H04N 5/232* (2006.01)

(52) U.S. Cl.
  USPC ..................... 348/231.99; 348/345

(58) Field of Classification Search
  None
  See application file for complete search history.

(56) References Cited

U.S. PATENT DOCUMENTS

| | | | |
|---|---|---|---|
| 7,266,224 B2 | 9/2007 | Sukegawa | |
| 7,336,807 B2 | 2/2008 | Tabata | |
| 7,693,310 B2 | 4/2010 | Kato et al. | |
| 7,734,098 B2 * | 6/2010 | Kikkawa et al. | 382/195 |
| 7,889,891 B2 | 2/2011 | Tsukiji et al. | |
| 7,973,833 B2 * | 7/2011 | Sugimoto | 348/231.99 |
| 2003/0071908 A1 * | 4/2003 | Sannoh et al. | 348/345 |
| 2004/0086157 A1 | 5/2004 | Sukegawa | |
| 2006/0012702 A1 * | 1/2006 | Kawahara et al. | 348/345 |
| 2009/0147107 A1 | 6/2009 | Kawahara et al. | |

FOREIGN PATENT DOCUMENTS

| | | |
|---|---|---|
| CN | 1494037 A | 5/2004 |
| JP | 9-322153 A | 12/1997 |
| JP | 2001-16606 A | 1/2001 |
| JP | 2007-6033 A | 1/2007 |

OTHER PUBLICATIONS

Chinese Office Action issued in corresponding Chinese patent application No. 200710129766.9 on Apr. 6, 2011 (with English translation).

Japanese Office Action issued on Apr. 26, 2011 (with English translation) in corresponding Japanese patent application No. 2007-182975.

* cited by examiner

*Primary Examiner* — Luong T Nguyen

(74) *Attorney, Agent, or Firm* — Birch, Stewart, Kolasch & Birch, LLP

(57) ABSTRACT

In an image taking system such as digital camera, especially when a predetermined objective body such as a face is included, an objective body detecting portion detects a predetermined objective body from an image taken by the image taking system. A storage portion stores a detection history including a past result of detection of the objective body and a newest result of detection of the objective body. A determination portion refers to the detection history and determines whether the objective body is to be handled as detected in the image obtained newest.

7 Claims, 14 Drawing Sheets

FIG.4

| ORIENTATION OF FACE | OUTPUT VALUE |
|---|---|
| FULL FACE | 0 |
| RIGHT SIDE FACE | 1 |
| LEFT SIDE FACE | −1 |

FIG.5

| INCLINATION OF FACE | OUTPUT VALUE | INCLINATION OF FACE | OUTPUT VALUE |
|---|---|---|---|
| 0° | 0 | | |
| 30° | 1 | 330° | −1 |
| 60° | 2 | 300° | −2 |
| 90° | 3 | 270° | −3 |
| 120° | 4 | 240° | −4 |
| 150° | 5 | 210° | −5 |
| 180° | 6 | | |

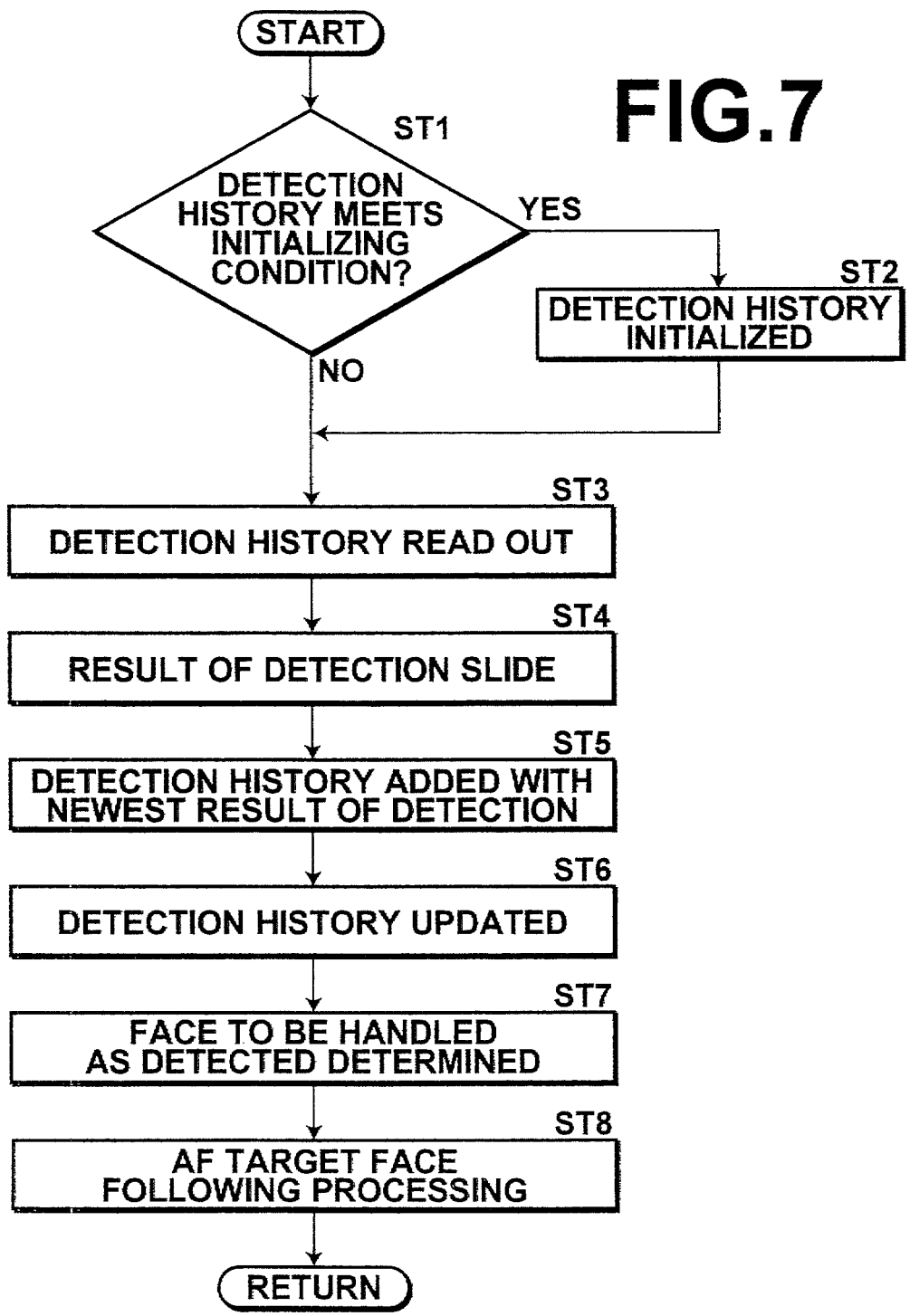

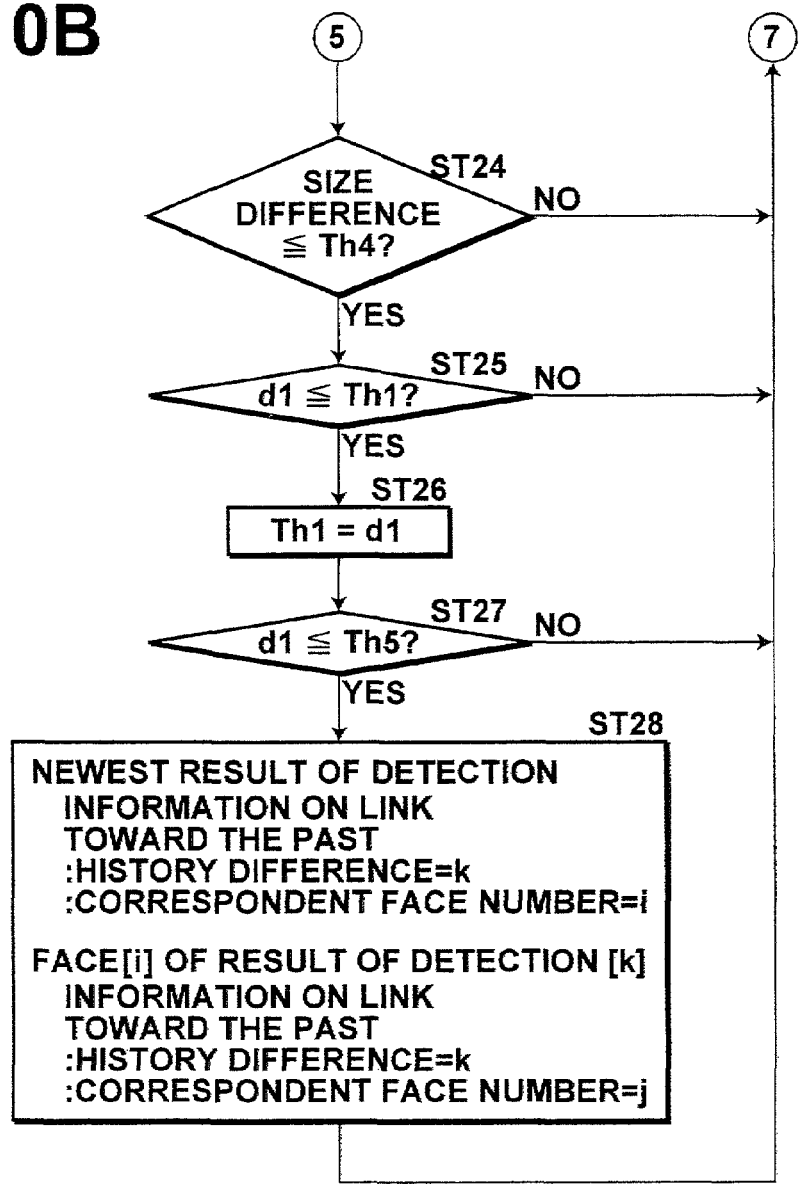

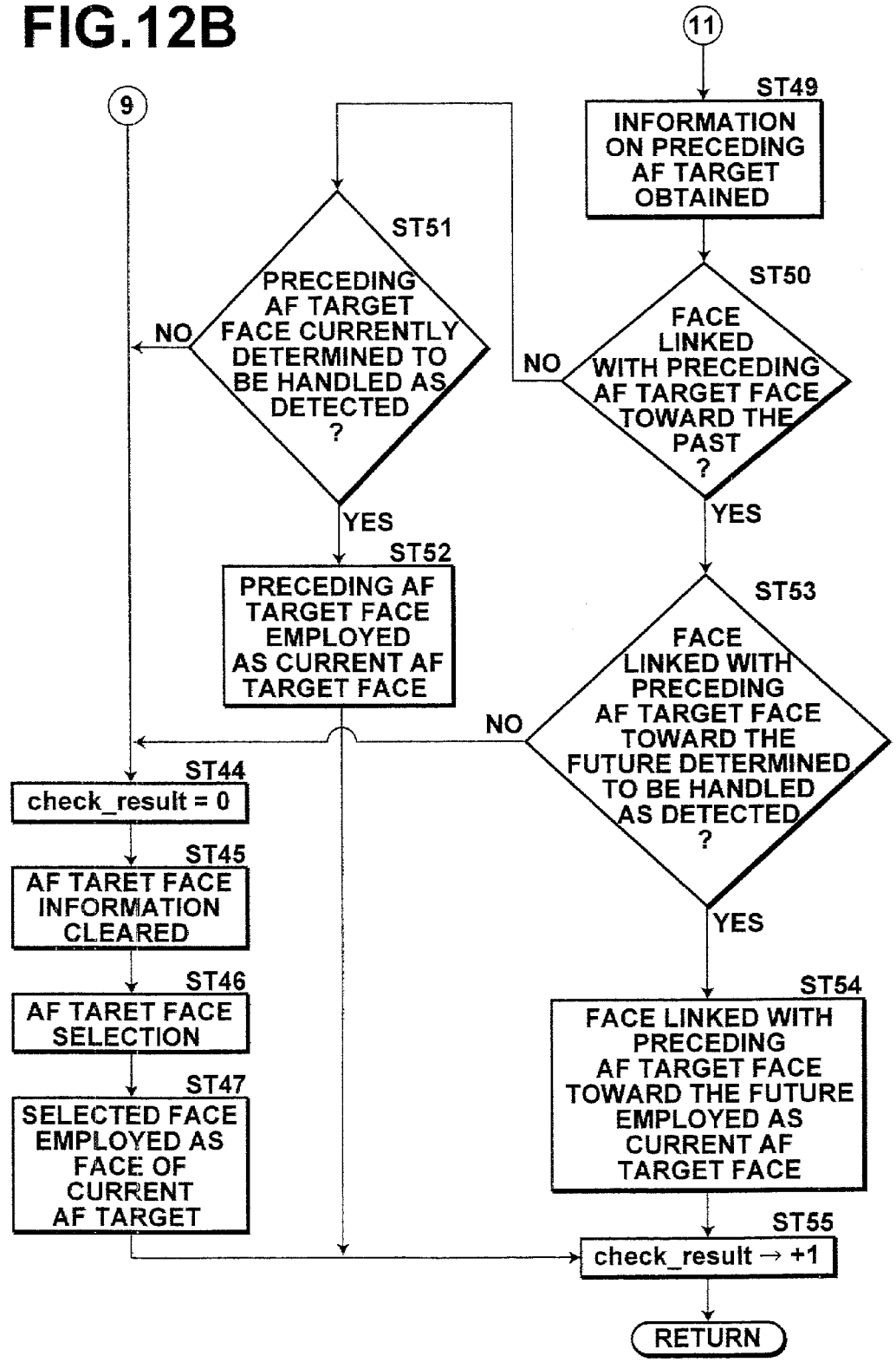

SYSTEM FOR AND METHOD OF TAKING IMAGE AND COMPUTER PROGRAM

This application is a Divisional Application of co-pending application Ser. No. 11/878,457 filed on Jul. 24, 2007, and for which priority is claimed under 35 U.S.C. §120; and this application claims priority of Application Nos. 202427/2006 filed in Japan on Jul. 25, 2006 under 35 U.S.C. §119; the entire contents of all are hereby incorporated by reference.

BACKGROUND OF THE INVENTION

1. Field of the Invention

This invention relates to a method of and a system for taking an image such as a digital camera, and a computer program for causing a computer to execute the method.

2. Description of the Related Art

Recently, in an image-taking by a digital camera, there have been carried out to detect an objective body such as the face from an image obtained by the image-taking and to change the conditions of the image processing to be carried out on the image and/or to change the image-taking conditions during the image-taking according to result of the detection.

Here, it has been proposed various technics to detect a predetermined object body in an image. For example, there is proposed a technic in which a characteristic value of an interesting image obtained from image information from an image taking system such as a monitor camera is stored, mobility vector of a mobility material is obtained by comparing the stored characteristic value with a matter in the direction of time such as the rate of change with time of the stored characteristic value, and determination of the interesting image in each time is carried out taking into account the degree of influence of the used characteristic on the result of determination by the use of the past characteristic of the interesting image, the rate of change of the characteristic and the result of evaluation of degree of dependability of each of the characteristics together with the obtained mobility vector. (See, Japanese Unexamined Patent Publication No. 9 (1997)-322153.)

Further, there has been proposed an action recognizing system where an area which is active and of a skin color is extracted in an area integrating portion as an objective body area by extracting an active area by an action detecting portion and a skin color area by a skin color detecting portion from a time sharing data of an input frame image and a shape and an action of the objective body are recognized by processing the time sharing data including an image of a specific objective body. (See, Japanese Unexamined Patent Publication No. 2001-16606.)

In the technincs disclosed in Japanese Unexamined Patent Publication Nos. 9 (1997)-322153 and 2001-16606, the objective body is detected on the basis of the past feature of the body to be detected. However there is desired to detect more efficiently the objective body.

SUMMARY OF THE INVENTION

In view of the foregoing observations and description, the primary object of the present invention is to more efficiently detect a predetermined objective body such as a face from an image.

An image taking system of the present invention comprises
an image taking means which takes an image by an image taking,
an objective body detecting means which detects a predetermined objective body from an image taken by the image taking means,
a storage means which stores a detection history comprising a past result of detection of the objective body and a newest result of detection of the objective body, and
a determination means which refers to the detection history and determines whether the objective body is to be handled as detected in the image obtained newest.

When the objective body has been detected not less than N times in the M times results of detection including the past results of detection (M≧N), the determination means may determine that the objective body is to be handled as detected in the image obtained newest.

Even when the objective body has not been detected not less than N times in the M times results of detection including the past results of detection, the determination means may determine that the objective body is to be handled as detected in the image obtained newest so long as the newest result of detection of the objective body meets predetermined conditions.

In this case, when the objective body has been detected not less than N times in the M times results of detection including the past results of detection (M≧N), the determination means may determine that the objective body is to be handled as detected in the image obtained newest so long as the newest result of detection of the objective body meets predetermined conditions even if no objective body has been detected in the newest result of detection of the objective body.

The image taking system of the present invention may be further provided with a selection holding means which, when the predetermined objective body which has been determined to be the objective body to be handled as detected is selected, and when a predetermined objective body corresponding to the selected objective body is detected in a new image, holds the selection of the predetermined objective body.

In the image taking system of the present invention, the determination means may smoothen at least one of the position and the size of each of a plurality of the objective bodies included in the detection history which are determined to be handled as detected and correspond to each other and output the smoothened information.

An image taking method of the present invention comprises the steps of
obtaining an image taken by an image taking means,
detecting a predetermined objective body from the image taken by an image taking means,
storing a detection history comprising a past result of detection of the objective body and a newest result of detection of the objective body, and
determining whether the objective body is to be handled as detected in the image obtained newest by referring to the detection history.

Further, a computer program for causing a computer to execute the image taking method of the present invention may be provided. The computer program may be recorded on a computer-readable medium. A skilled artisan would know that the computer readable medium is not limited to any specific type of storage devices and includes any kind of device, including but not limited to CDs, floppy disks, RAMs, ROMs, hard disks, magnetic tapes and internet downloads, in which computer instructions can be stored and/or transmitted. Transmission of the computer code through a network or through wireless transmission means is also within the scope of this invention. Additionally, computer code/instructions include, but are not limited to, source, object and executable code and can be in any language including higher level languages, assembly language and machine language.

In accordance with the present invention, a new objective body is detected in a new image obtained by the image taking and whether the objective body is to be handled as detected in the image obtained newest is determined by referring to the detection history comprising a past result of detection of the objective body and a newest result of detection of the objective body. Accordingly, the predetermined objective body can be efficiently detected by the use of the past result of detection.

BRIEF DESCRIPTION OF THE DRAWINGS

FIG. 4 is a view showing a table representing the output of the orientation of the face, FIG. 5 is a view showing another table representing the output of the orientation of the face, FIG. 7 is a flowchart showing the processing to be executed in this embodiment, FIGS. 10A and 10B are views showing the other part of a flowchart for illustrating the update of the detection history, FIGS. 12A and 12B show a flowchart of the AF target face following processing.

DESCRIPTION OF THE PREFERRED EMBODIMENT

Figure 1:
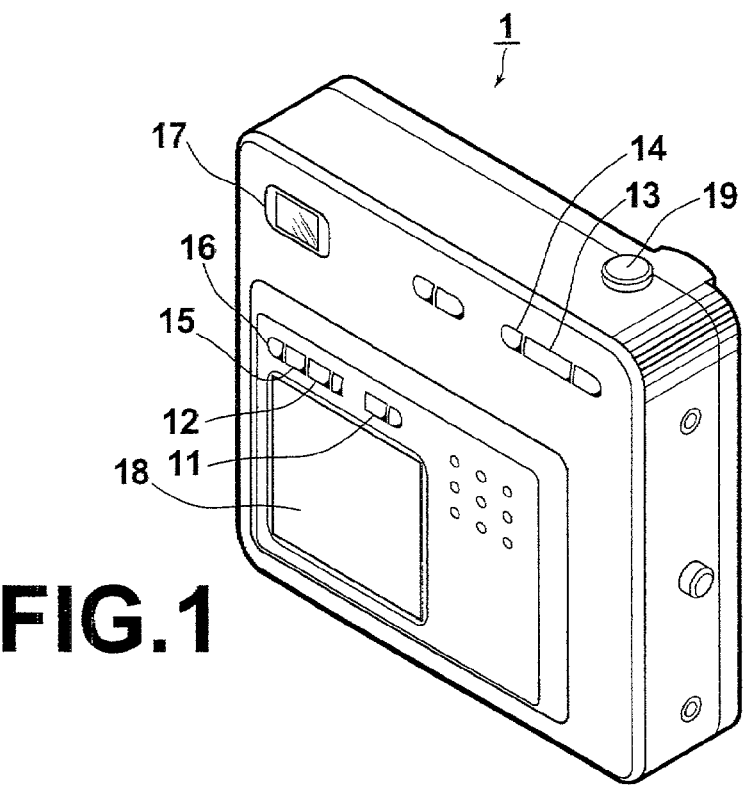
FIG. 1 is a perspective view showing a digital camera in accordance with a first embodiment of the present invention as viewed from rear.
Figure 2:
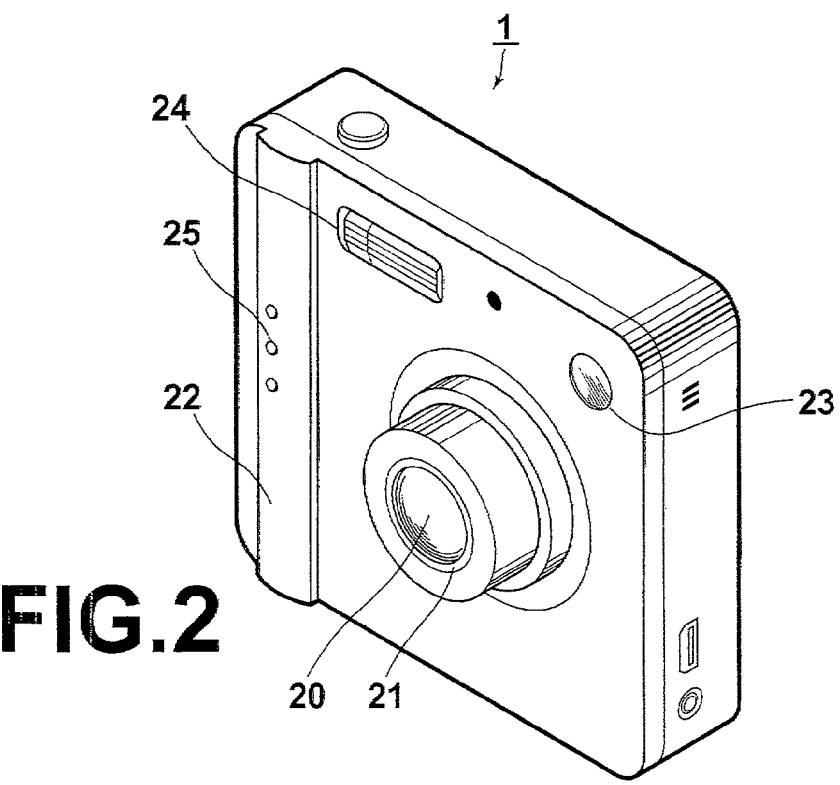
FIG. 2 is a perspective view showing the digital camera of the first embodiment as viewed from front.

Embodiments of the present invention will be described with reference to the drawings, hereinbelow. FIG. 1 is a perspective view showing a digital camera in accordance with a first embodiment of the present invention as viewed from rear. As shown in FIG. 1, as an interface for control by the photographer, an action mode switch 11, a menu/OK button (input means) 12, a zoom/up and down arrow lever 13, a right and left arrow button 14, a back (return) button 15 and a display switching button 16 are provided on the rear surface of the body of the digital camera 1. The rear surface of the body of the digital camera 1 is further provided with a finder 17 for image taking and a liquid crystal monitor 18 and the upper surface of the camera body is provided with a shutter release button 19. FIG. 2 is a perspective view showing the digital camera of the first embodiment as viewed from front.

As shown in FIG. 2, a taking lens 20, a lens cover 21, a power switch 22, the finder window 23, a strobe light 24 and a self-timer lamp 25 are provided on the front surface of the camera body 10.

The action mode switch 11 is a slide switch for switching the action modes between a still image taking mode, an animation taking mode and a reproduction mode.

The menu/OK button 12 is a button for displaying on the monitor 18 various menus for setting the kind of the image taking mode, a strobe lighting mode, recording pixel number or sensitivities in response to depression thereof, and for selection/setting on the basis of the menu displayed on the monitor 18. Further, by the menu/OK button 12, it is possible to set the image taking mode to a full auto-mode where the exposure and the white balance are all automatically set or a manual mode where the exposure and the white balance are all manually set. As the manual mode, a program auto-mode, an aperture priority mode, a shutter priority mode, and a manual exposure mode can be set. Further, by the menu/OK button 12, it is possible to set as the manual mode an image taking mode where the image taking is carried out according to the kind of scene, that is, the landscape, the flower, the evening glow, or the human.

When the zoom/up and down arrow lever 13 is inclined up and down, tele/wide of the camera 1 is adjusted when an image is to be taken and the cursor displayed in the menu screen displayed on the monitor 18 is moved up and down when various values are set.

The right and left arrow button 14 is a button for moving right and left the cursor in the menu screen displayed on the monitor 18 when various values are set.

When the back (return) button 15 is depressed, setting of the various values is interrupted, and the processing is returned to the preceding screen displayed on the monitor 18.

The display switching button 16 is a button for switching ON and OFF of the display on the monitor 18, various guidance messages, ON and OFF of the character display when depressed.

The contents set by the control of the button or the lever can be recognized through the display on the monitor 18, the lamp in the finder, the position of the slide lever or the like. Further, the monitor 18 displays a through image for confirming the object when taking an image. With this arrangement, the monitor 18 displays a still image and an animation after photographing and various values set in the menus as well as functions as an electronic viewfinder.

Figure 3:
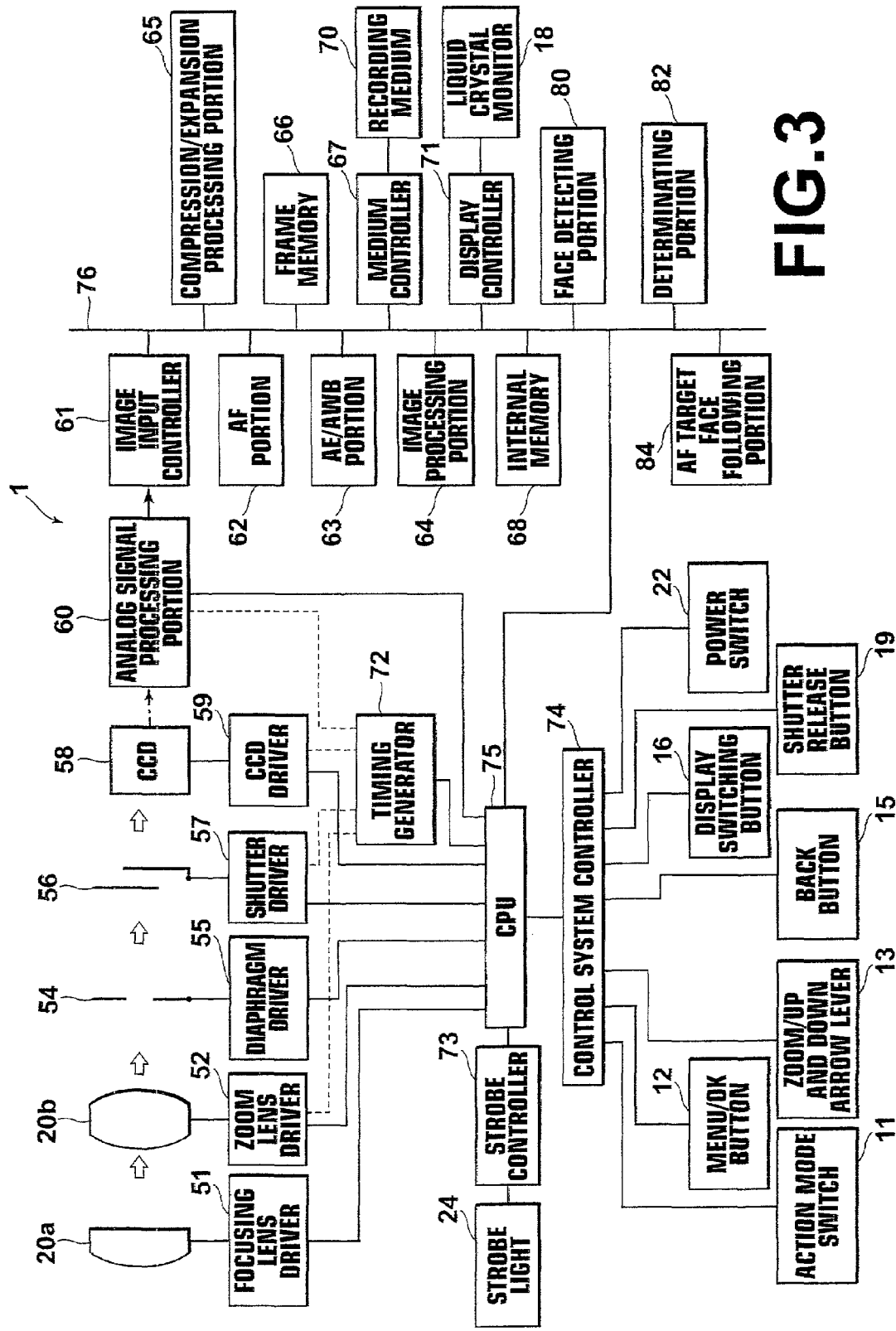
FIG. 3 is a block diagram showing structure of the digital camera of the first embodiment.

FIG. 3 is a block diagram showing functions of the digital camera 1 in accordance with an embodiment of the present invention. The digital camera 1 shown in FIG. 3 converts image data obtained by the image taking to an image file in the Exif format and records it on an external recording medium 70 detachable from the camera body.

As the control system of the digital camera 1, there are provided the action mode switch 11, menu/OK button 12, zoom/up and down arrow lever 13, right and left arrow button 14, back (return) button 15, display switching button 16, shutter release button 19, power switch 22 and a control system control portion 74 which is an interface for transferring the contents of control of the elements described above to a CPU 75.

As an optical system, a focusing lens 20a and a zoom lens 20b are provided. The lenses 20a and 20b are driven respectively by a focusing lens driver 51 and a zoom lens driver 52 comprising an electric motor and a motor driver to be moved in the direction of the optical axis. The focusing lens driver 51 drives the focusing lens 20a on the basis of focus driving amount data output from an AF portion 62. The zoom lens driver 51 drives the zoom lens 20b on the basis of data on the amount of control of the zoom/up and down lever 13.

A diaphragm 54 is driven by a diaphragm driver 55 comprising an electric motor and a motor driver. The diaphragm driver 55 adjusts the diameter of opening of the diaphragm 54 on the basis of diaphragm data output from an AE/AWB portion 63.

Shutter 56 is a mechanical shutter and is driven by a shutter driver 57 comprising an electric motor and a motor driver. The shutter driver 57 controls open/closure of the shutter 56 on the basis of a signal generated in response to depression of the shutter release button 19 and shutter speed data output from the AE/AWB portion 63.

Behind, the optical system described above, a CCD 58 which is an image-taking element is provided. The CCD 58 has a photoelectric surface comprising a lot of two-dimensionally arranged light receiving elements, and an image of the object passing through the optical system is imaged on the photoelectric surface to be photoelectrically converted. Forward of the photoelectric surface, there are disposed a microlens array for collecting light on each of the pixels and a color-filter array comprising a lot of R, G, B filters (red filters, green filters and blue filters) which are regularly arranged. The CCD 58 outputs electric charges accumulated by the pixels line by line as serial analog image-taking signals in synchronization with vertical and horizontal clock signals supplied from a CCD control portion 59. The electric charge accumulating time of each pixel, that is, the exposure time, is determined by an electronic shutter-drive signal given by the CCD control portion 59. The CCD 58 has been adjusted in its gain by the CCD control portion 59 so that an analog image-taking signals of a predetermined amplitude can be obtained.

The analog image-taking signals taken in from the CCD 58 is input into an analog signal processing portion 60. The analog signal processing portion 60 comprises a correlation double sampling circuit (CDS) for removing noise of the image signal, an auto-gain controller (AGC) for adjusting the gain of the analog signal and an A/D converter (ADC) for converting the analog signal to a digital image data. The digital image data is a CCD-RAW data having R, G, B density values by each of the pixels.

A timing generator 72 generates timing signals, and the timing signals are input into the shutter driver 57, the CCD control portion 59 and the analog signal processing portion 60 to synchronize operation of the shutter button 19, open and closure of the shutter 56, taking in of the electric charge of the CCD 58 and processing by the analog signal processing portion 60.

A strobe control portion 73 causes the strobe light 24 to emit light upon image taking. Specifically, so long as the strobe light emission mode is on and the strobe light emission mode is the auto mode, strobe light 24 is turned on to light the strobe light 24 upon image taking when the brightness of the pre-image (to be described later) is lower than the predetermined brightness. On the other hand, when the strobe light emission mode is off, the strobe light 24 is inhibited from being lit upon image taking.

An image input controller 61 writes, in a frame memory 66, the COD-RAW data input from the analog signal processing portion 60.

The frame memory 66 is a working memory for use when each of various digital image processing (signal processing) to be described later is to be carried out on the image data, and may comprise an SDRAM (synchronous dynamic random access memory) which transfers data in synchronization with bus clock signals of a constant period.

A display control portion 71 is for displaying on the monitor 18, image data stored in the frame memory 66 as a through image, and for displaying on the monitor 18, image data stored in the external recording medium 70 when the reproduction mode has been set. The through image is taken at predetermined time intervals by the CCD 58 during selection of the image taking mode.

The AF portion 62 and the AE/AWB portion 63 determines the image-taking conditions on the basis of the pre-image. The pre-image is represented by image data stored in the frame memory 66 as a result of the CPU 75 causing the CCD 58 to execute pre-image taking upon detection of a semi-depression signal generated in response to semi-depression of the shutter release button 19.

The AF portion 62 detects the focusing position on the basis of the pre-image and outputs focusing-lens drive amount data (AF processing). As the system for detecting the focusing point, a passive system where the focusing point is detected on the basis of a feature that the contrast of an image in focus increases is conceivable.

The AE/AWB portion 63 measures the brightness of the object on the basis of the pre-image and determines diaphragm value and shutter speed on the basis of the measured brightness of the object, thereby determining the diaphragm value data and shutter speed data as the set value of exposure (AE processing) while automatically adjusts white balance (AWB processing) upon image-taking When the image-taking is in the manual mode, the operator of the digital camera 1 can manually set the exposure and the white balance. Even when the exposure and the white balance are automatically set, they can be manually adjusted by operator's instruction through the control system such as the menu/ok button 12.

An image processing portion 64 carries out the image quality corrections such as a gradation correction, a sharpness correction and a color correction on the image data of the running image, and carries out YC processing where the COD-RAW data is converted to YC data comprising Y data which is a brightness signal, Cb data which is a blue difference signal and Cr data which is a red difference signal. This "running image" is an image based on image data which is stored in the frame memory 68 by way of the analog signal processing portion 60 and the image input controller 61 after an image signal is taken in from the CCD 58 in taking the running image to be executed in response to full-depression of the shutter release button 19. Though the upper limit of the number of pixels of the "running image" is governed by the number of pixels of the CCD 58, the number of pixels used in the recording can be changed, for instance, by the user's setting an image quality (fine, normal and the like). On the other hand, the number of pixels of the through image and/or a pre-image may be smaller than that of the running image, for instance, about 1/16 thereof.

A compression/expansion processing portion 65 compresses, for instance, in JPEG format, the image data of the running image which has been processed with the correction and the conversion by the image processing portion 64 and generates an image file. To this image file, a tag in which information such as photographing date is stored on the basis of the format or the like is attached. This compression/expansion processing portion 65, in a reproduction mode, reads out the compressed image file from the external recording medium 70 and expands it. Expanded image data is output to the monitor 18.

The medium control portion 67 accesses the external recording medium 70 to control read and write of the image file.

An internal memory 68 stores various constants set in the digital camera 1 and a program to be executed by the CPU 75.

The face detecting portion 80 detects the face of a human from the respective through images which are continuously obtained at predetermined intervals. Specifically, the face detecting portion 80 detects as a face area the area having features of the face included in the face (for instance, has a skin color, has eyes, or has a contour of the face, or the like). However, the face detecting portion 80 need not be limited to such a structure. Further, the face detecting portion 80 also detects the position of the center, the size, the inclination on the plane and the orientation (toward the front, right or left) of the face and outputs them.

The face detecting portion 80 detects as a face area the area having features of the face included in faces (for instance, has a skin color, has eyes, or has a contour of the face, or the like).

For example, technic disclosed in Japanese Unexamined Patent Publication No. 2006-202276 can be employed. The technic disclosed in Japanese Unexamined Patent Publication No. 2006-202276 is conceivable that the face pursuit is based on a machine learning technic employing Adaboost where a known technic such as movement vectors, detection of a feature point or the like and learning data are updated time to time by weighting them upon re-sampling and the obtained machines are finally added up with the weight for the learning machines to make integrated learning machines. It is a technic, for instance, for detecting positions of points representing landmarks from image of faces by the use of distinguishers obtained by carrying out learning on brightness profiles of points of a plurality of sample images which are known as predetermined•landmarks and which are known as not a predetermined•landmark by a machine learning technic upon construction of a frame model by fitting an averaged frame model in the actual face image and changing the averaged frame model so that the position of each landmark on the averaged frame model conforms to the position of the correspondent landmark detected from the face and distinguishing conditions for each of the distinguishers. It is possible to employ the technic of Japanese Unexamined Patent Publication No. 2004-334836. The technic of Japanese Unexamined Patent Publication No. 2004-334836 is a technic for detecting whether there is an image of a featured part in image data to be processed by cutting out image data of a predetermined size from the image data and comparing the image data cut out with the reference data of the featured part. As the technic disclosed in Japanese Unexamined Patent Publication No. 2007-011970, a face of animal and the like may be detected as the particular object instead of a face of human.

The face detecting portion 80 outputs a predetermined value for the orientation and the inclination of the face. FIG. 4 shows the output value for each orientation of the face, and FIG. 5 shows the output value for each inclination of the face. As shown in FIG. 4, the face detecting portion 80 outputs 0 when the face is directed toward the front (full face), outputs 1 when the face is directed toward right (right side face) and outputs −1 when the face is directed toward the left (left side face).

As shown in FIG. 5, the face detecting portion 80 outputs 0, 1, 2, 3, 4, 5, 6, −5, −4, −3, −2, −1 for the inclinations of the face by 30° from the vertical direction (0°) to 330°.

Further, the face detecting portion 80 outputs a length of a side of a rectangle including the detected face area as a size of the face and outputs values of the two-dimensional coordinates of the center of the face as a central position of the face.

A determining portion 82 determines whether the new face detected in the newest through image out of those taken at predetermined intervals is to be handled as detected and at the same time, updates a detection history. Specifically, the determining portion 82 determines whether the new face is to be handled as detected by referring to the detection history of the faces determined to be handled as detected and at the same time, updates the detection history. The detection history comprises a past result of detection of the objective body and a newest result of detection of the objective body and is stored in an internal memory 68.

A follower processing portion 84 follows the face to be handled as an AF target as will be described later.

The CPU 75 controls each element of the digital camera 1 according to signals from the various processing portions such as the control systems (e.g., the action mode switch 11) and the AF portion 62.

A data bus 76 is connected to the image input controller 61, each of the processing portions 62 to 65, the frame memory 66, the medium control portions 67, the internal memory 68, the display control portion 71, the face detecting portion 80, the follower processing portion 84 and the CPU 75, and each of the pieces of data such as the digital image data is transmitted and received by way of the data bus 76.

Figure 6:
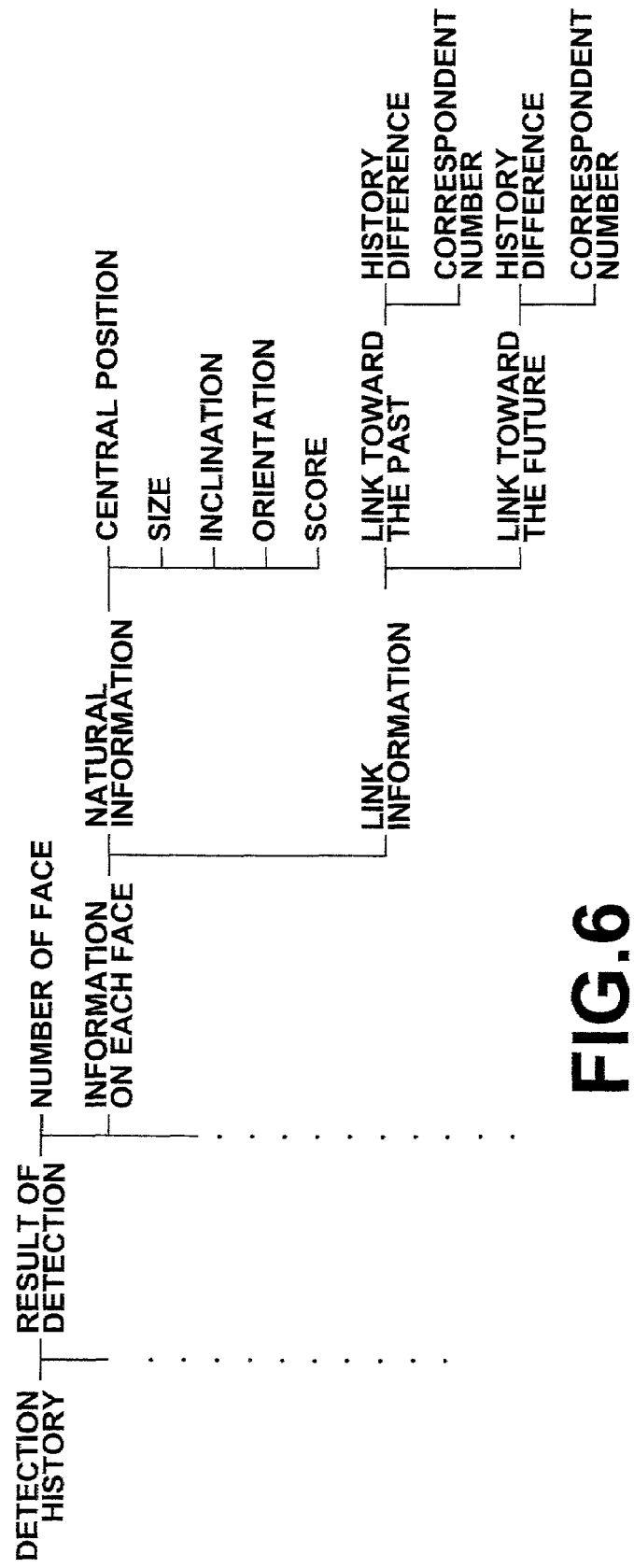
FIG. 6 is a view showing the data structure of the detection history.

An operation of the digital camera 1 will be described, hereinbelow. In this embodiment, M times past results of detection and the newest result of detection are stored in an internal memory 68 as the detection history. FIG. 6 shows data structure of the detection history. The detection history holds the M times past results of detection and the newest result of detection. The result of detection of each time holds the number of faces detected in the time of detection and information on each face comprising natural information and link information. The faces detected in the time of detection are attached with a serial number starting from 0.

The natural information includes the position of the center, the size, the inclination and the orientation of the face detect by the face detecting portion 80, and the score of the result of detection. The score is a value representing the likelihood that the detected face is a real face and the larger, the score is, the likelihood that the detected face is a real face is stronger.

The link information includes a link toward the past and a link toward the future. The link toward the past includes a history difference representing the number of the results of detection including the correspondent face by which it is prior to the result of detection as numbered from the result of detection, and the number of the correspondent face in the past result of detection. The link toward the future includes a history difference representing the number of the results of detection including the correspondent face by which it is after the result of detection as numbered from the result of detection, and the number of the correspondent face in the future result of detection.

The detection history is initialized when the power source of the digital camera 1 is turned on, when the face detecting function is turned on, when the running image taking is ended and when the mode of the digital camera 1 is changed.

FIG. 7 is a flowchart showing processing to be executed in this embodiment. This processing is to be done each time a through image is obtained and a face is detected in the obtained through image while the digital camera 1 is in the image taking mode. When a new through image is obtained and a face is detected in the obtained through image, the determining portion 82 starts the processing. Whether the condition of initialization of the detection history is satisfied is determined. (step ST1) When step ST1 is affirmed, the detection history is initialized. (step ST2) When step ST1 is denied, or after step ST2, the detection history stored in the internal memory 68 is read out. (step ST3)

Figure 8A:
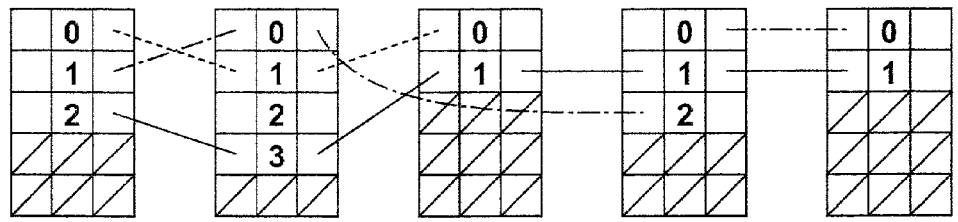
FIGS. 8A to 8D are views schematically showing the detection history.

FIGS. 8A to 8D are views schematically showing the detection history read out. In FIGS. 8A to 8D, the detection history is indicated by "history" and includes the past five results of detection, history [0] to history [4] for the purpose of simplicity. Further, the smaller, the value of the history is, the newer the history is. The numbers written in each history are the number of detected faces. As shown in FIG. 8A, three faces, #0 to #2 faces, are detected in history [0] which is a newest result of detection. Four faces, #0 to #3 faces, are detected in history [1]. Two faces, #0 to #1 faces, are detected in history [2]. Three faces, #0 to #2 faces, are detected in history [3]. Two faces, #0 to #1 faces, are detected in history [4].

In FIG. 8A, that #0, 1, 0 faces in history [0], [1], and are linked, #1, 0, 2 faces in history [0], [1], and [3] are linked, #2, 3, 1, 1 faces in history [0] to [4] are linked, and #0, 0 faces in history [3] and [4] are linked is shown by joining the figures representing linked faces with different straight line segments.

Figure 8B:
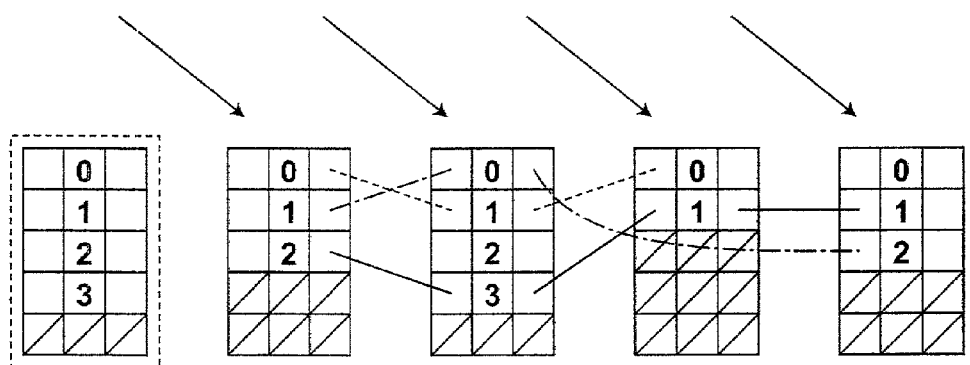

Then the determining portion 82 slides the past results of detection in the detection history in order to detect and add the result of detection in the new through image (the newest result of detection). (step ST4) This slide of the results of detection is processing where the oldest result of detection in the stored M past results of detection is removed and the newest result of detection is added to the detection history. Specifically, as shown in FIG. 8B, while the history [4] is removed and the history [0] to [3] is made to new history [1] to [4], the new result of detection is added as a new history [0].

Figure 9:
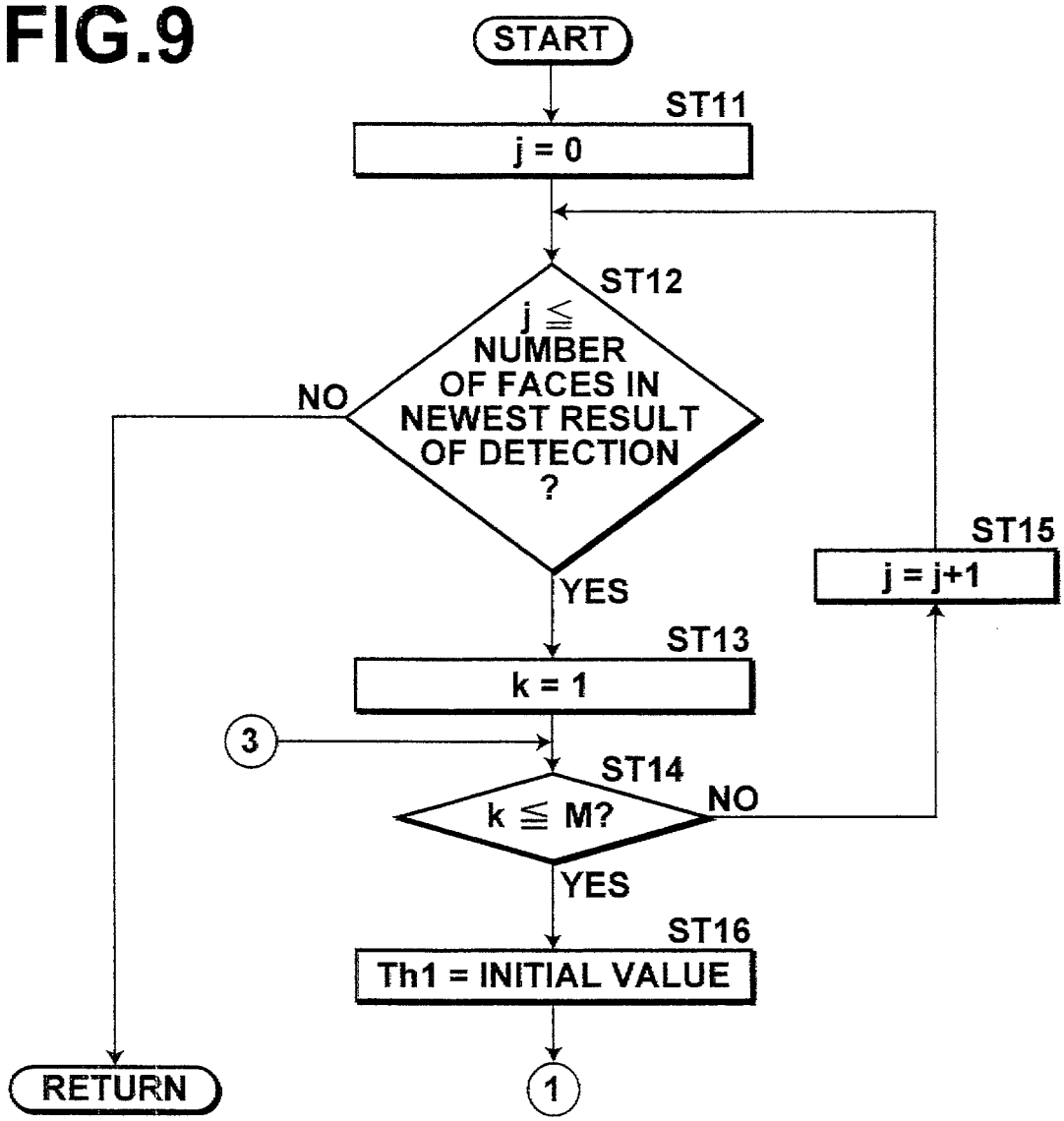
FIG. 9 is a view showing a part of a flowchart for illustrating the update of the detection history.
Figure 10A:
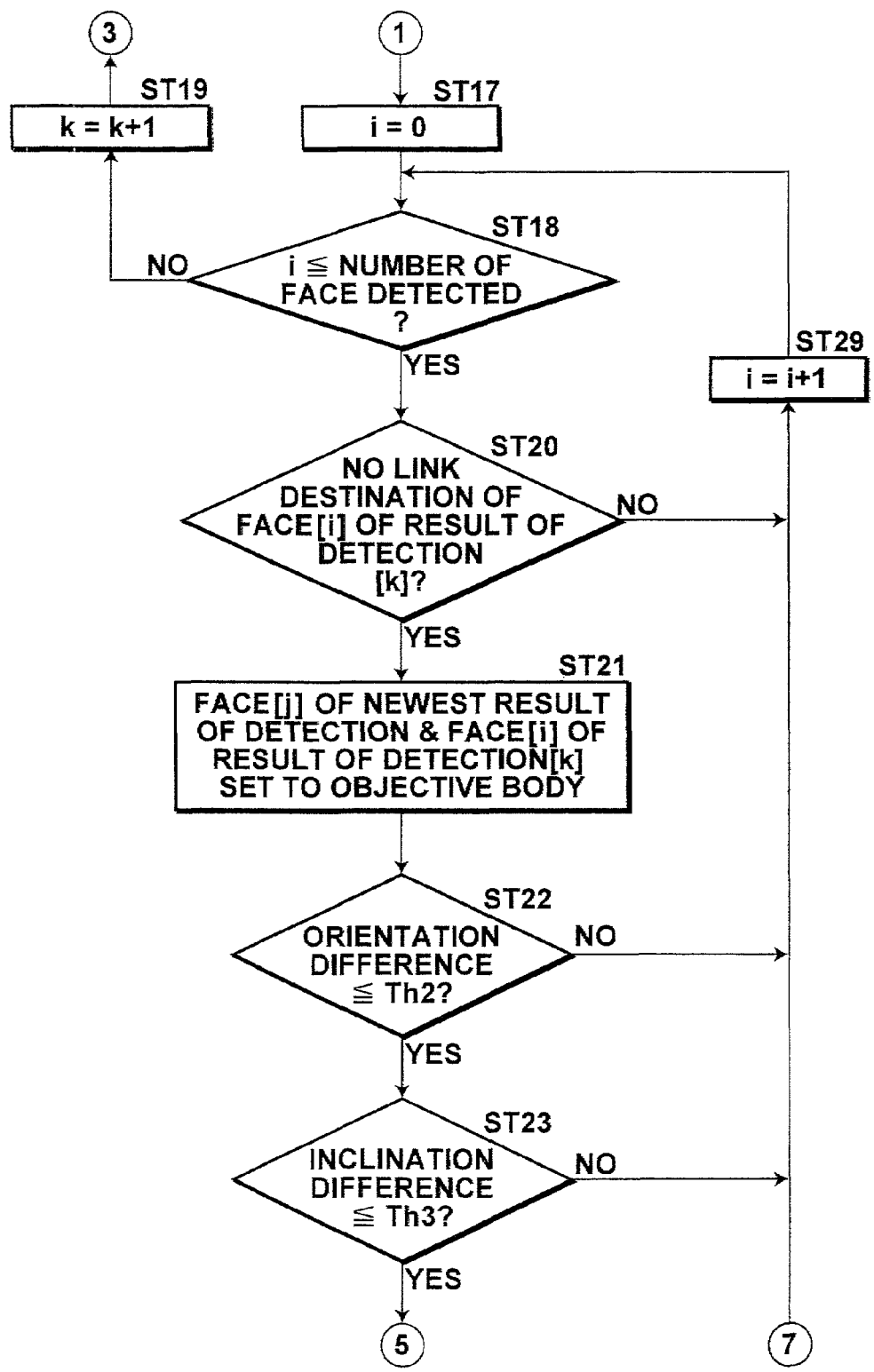

Then the newest result of detection is added. (step ST5) In FIG. 8B, it is assumed that four faces (#0 to #3) are detected in the newest result of detection. Then, the newest result of detection is linked with the past results of detection and the detection history is updated. (step ST6) The update of the detection history will be described, hereinbelow. FIGS. 9 and 10 show a flowchart of updating the detection history.

The determining portion 82 first sets the number j of face included in the newest result of detection to 0 which is an initial value (step ST11) and determines whether j is not larger than the number of faces included in the newest result of detection (step ST12). When step ST12 is denied, the processing is returned. When step ST12 is affirmed, k is set to 1 to make the newest result of detection other than the newest result of detection included in the detection history the object of determining the link (step ST13) and whether k is not larger than M which is the maximum in the result of detection is determined. (step ST14) When step ST14 is denied, the object of determining the link is set to the face of the next number (j=j+1: step ST15) and the processing is returned to step ST12.

When step ST14 is affirmed, a threshold value Th1 for determining a center-to-center distance of faces (to be described later) is set to an initial value. (step ST16) The initial value has a value for determining whether faces are adjacent to each other, and is updated to decrease as the center-to-center distance d1 of faces increases as will be described later.

In the result of detection [k] which is currently the object, the number i of a face which is the object of determining the link is set to 0 which is an initial value (step ST17) and determines whether i is not larger than the number of faces determined to be handled as detected (the total number of detected faces: step ST18). When step ST18 is denied, the result of detection [k] which is the object of determining the link is set to the next oldest result of detection (k=k+1: step ST19) and the processing is returned to step ST14.

When step ST18 is affirmed, whether face [i] of the result of detection [k] has a link toward the future is determined. (step ST20) In FIG. 8B, all the faces in the history [1] has no link toward the future. Though the faces 0, 1, and 3 in the history [2] has a link toward the future, the face 2 in the history [2] has no link toward the future. When step ST20 is affirmed, the face [j] of the newest result of detection and the face [j] of the result of detection [k] are set to be object of determining the link. (step ST21)

Then whether the difference between the orientations of the faces [j] and [i] is not smaller than the predetermined threshold value Th2 is determined. (step ST22) When the threshold value Th2 is 0, only the faces oriented in the same direction are determined to be identical, when the threshold value Th2 is 1, the faces oriented in the directions different from each other by 90° are determined to be identical and when the threshold value Th2 is 2, the faces oriented in any directions are determined to be identical.

When step ST22 is affirmed, whether the difference between the inclinations of the faces [j] and [i] is not smaller than a predetermined threshold value Th3 is determined. (step ST23) It is preferred that the threshold value Th3 be of a value which can determine faces different from each other in inclination up to 30° as identical.

When step ST23 is affirmed, whether the difference between the sizes of the faces [j] and (i) is not smaller than a predetermined threshold value Th4 is determined. (step ST24)

When step ST24 is affirmed, whether the difference between the center-to-center distances d1 of the faces [j] and is not smaller than the predetermined threshold value Th1 is determined. (step ST25) Instead of the center-to-center distances, square of the center-to-center distances may be used.

When step ST25 is affirmed, the value of the threshold value Th1 is updated to the value of the center-to-center distance d1 (step ST24) and whether the value of the center-to-center distance d1 is not smaller than the predetermined threshold value Th5. (step ST27)

When step ST27 is affirmed, the destination of the face [j] toward the past to which the face [j] is linked toward the past is set to the face [i] of the result of detection [k] and the destination of the face [i] toward the future to which the face [i] is linked toward the future is set to the face [j] of the newest result of detection. That is, information on the destination of the face [j] toward the past is set to the history difference k and the correspondent number i and information on the destination of the face [i] toward the future is set to the history difference k and the correspondent number j. (step ST28) Then, the object of determining the link in the result of detection [k] is set to the next face (i=i+1: step ST29) and the processing is returned to step ST18.

When the step ST20, ST22, ST23, ST24, ST25 or ST27 is denied, the object of determining the link in the result of detection [k] is set to the next face (i=i+1: step ST29) and the processing is returned to step ST18.

Figure 8C:
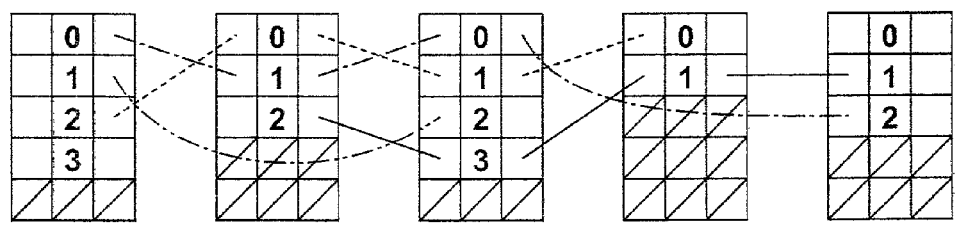

With this arrangement, for instance, as shown in FIG. 8C, the faces 0, 2 of the history [0] which is the newest result of detection is linked to the faces 1, 0 of the history [1] and the face 1 of the history [0] is linked to the face 2 of the history [2].

Returning to FIG. 7, a face to be handled as detected is determined after step ST6. (step ST7) Determination of the face to be handled as detected will be described, hereinbelow. When the face has been detected not less than N times in the M times results of detection included in the detection history, the determination portion 82 determines that the face is to be handled as detected. (a first condition) Even if it has not been detected in the newest result of detection, the determination portion 82 determines that the face which has been detected not less than N times in the M times results of detection is to be handled as detected so long as the first condition has been met. (a second condition) Further, even if the first condition has not been met, the determination portion 82 determines that the face detected in the newest result of detection is to be handled as detected so long as its score is not smaller than a predetermined threshold value Th10. (a third condition)

Figure 15A:
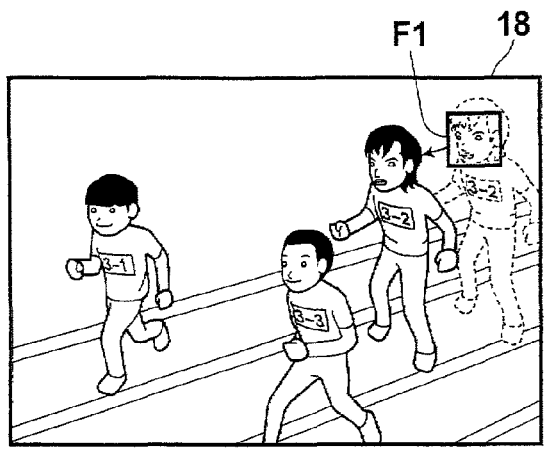

Further, whether the determination portion 82 determines that the face which has not been detected in the newest result of detection is to be handled as detected may be switched not to determine that the face which has not been detected in the newest result of detection is to be handled as detected when the center of the face is in the periphery of the image.

Where the face which has not been detected in the newest result of detection is determined to be handled as detected, there is a case where there is a strong probability from the movement of the object that even a face whose center is in the periphery of the image moves to the center of the image. At this time, the detecting frame may be controlled as shown FIGS. 15A to 15C. The human shown in the dotted line is the newest in the faces having the result of detection, and the human shown in the solid line shows an image of a person who is expected to be in the image before the result of detection is obtained. In FIG. 15A, the detecting frame will be left there when displayed on the basis of the detecting position of the face newest in the faces having the result of detection. However, by detecting an image of a person who is expected to be in the image, the frame can be displayed following the movement of the person as shown by the arrow in FIG. 15A.

Figure 15B:
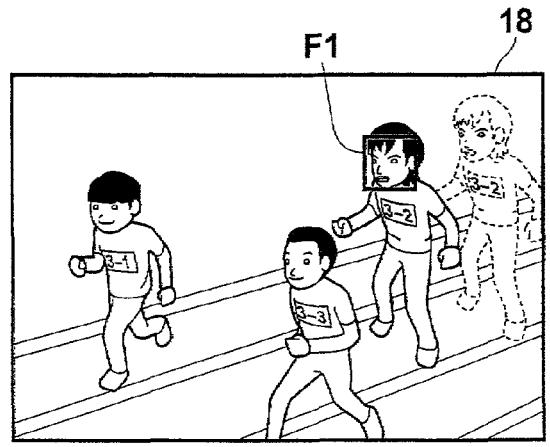

As shown in FIG. 15B, an image of the object which is presently expected to be in the image is estimated on the basis of the movement vectors. A detecting frame is displayed on the basis of the estimated position of the face. In the method of estimation by the movement vectors, the position of the face may be estimated on the basis of change in the position of the center of the face which has been detected in the newest result of detection. Further, the position of the face may be calculated from change of the movement vectors derived through comparison with the whole of the particular frame which forms the reference when the newest result of detection is obtained.

Figure 15C:
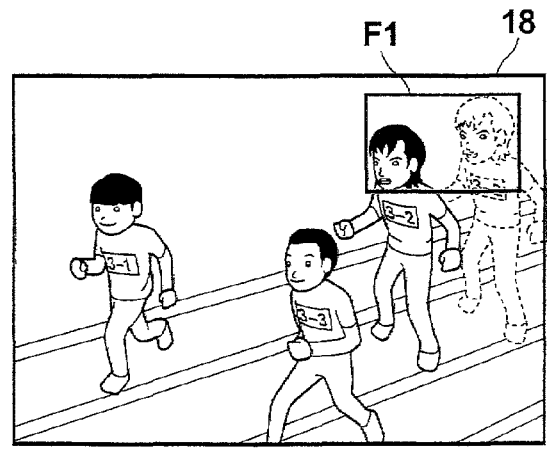

Further, as shown in FIG. 15C, the frame is displayed large on the basis of the detecting position of the face newest in the faces in which the result of detection is obtained from the history and the position of the face estimated from the movement vectors. This arrangement is effective in that the user visually recognizes as if detected even if the object cannot be detected by the time when the newest result of detection is obtained.

The embodiment described above can record the frame on the external recording medium 70 or the frame memory 66 as position information of the detected face without limited to displaying the frame.

The recorded position information of the detected face can be employed in the AF processing by the AF portion 62 and the AE processing and/or the AWB processing by the AE/AWB portion 63.

Figure 8D:
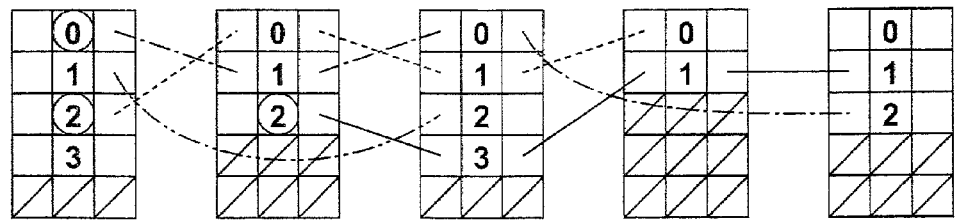

When the determination portion 82 determines in FIGS. 8A to 8D that the face which has been detected three times out of five times is to be handled as detected, the faces 0 and 2 of the history [0] which the newest result of detection and the face 2 of the history [1] are determined to be handled as detected as shown in FIG. 8D. In FIG. 8D, the numbers of the faces which are determined to be handled as detected are attached with o.

Figure 11:
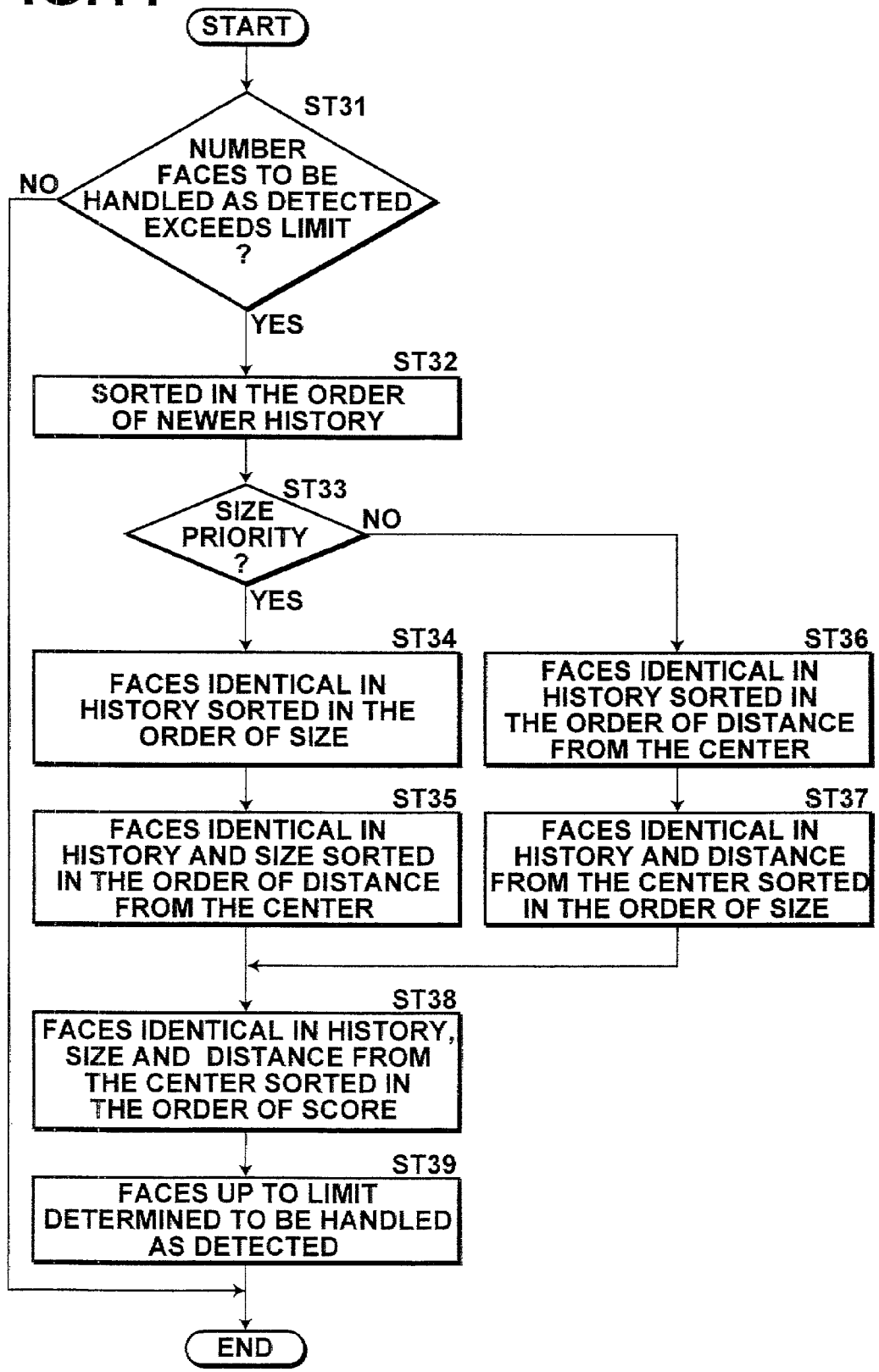
FIG. 11 is a flowchart of the processing when the number of the faces which are determined to be handled as detected exceeds the limit.

When the number of the faces which are determined to be handled as detected is too large, the through image is hard to view when the through image is displayed while the faces determined to be handled as detected are attached with the detecting frames as will be described later. Accordingly, in this embodiment, the number of the faces which are determined to be handled as detected is limited and when the number of the faces which are determined to be handled as detected exceeds the limit, the number of the faces which are determined to be handled as detected is limited within the limit. The processing when the number of the faces which are determined to be handled as detected exceeds the limit will be described, hereinbelow. FIG. 11 shows a flowchart of the processing when the number of the faces which are determined to be handled as detected exceeds the limit.

The determination portion 82 determines whether the number of the faces which are determined to be handled as detected exceeds the limit (step ST31), and when step ST31 is denied, the processing is ended. When step ST31 is affirmed, the determination portion 82 sorts the faces which are determined to be handled as detected in the order in which the detecting history is newer. (step ST32) Then, the determination portion 82 determines whether the digital camera 1 has been set to take a priority the size of the face for the faces of the same detecting histories (step ST33), and when step ST33 is affirmed, the determination portion 82 sorts the faces which are the same in the detecting histories Then the determination portion 82 sorts the faces which are same in the detecting histories and the sizes in the order in which the distance from the center of the through image is smaller. (step ST35)

When step ST33 is denied, the determination portion 82 sorts the faces which are the same in the detecting histories in the order in which the distance from the center of the through image is smaller. (step ST36) Then the determination portion 82 sorts the faces which are same in the detecting histories and the distances from the center of the through image in the order in which the size is larger. (step ST37)

After step ST35 or 37, the determination portion 82 sorts the faces which are same in the detecting histories, the size and the distances from the center of the through image in the order in which the score is larger. (step ST38) Then the determination portion 82 finally determines that the faces up to the limit in the result of sort is to be handled as detected (step ST39) and ends the processing.

Returning to FIG. 7, the determination portion 82 executes an AF target face following processing after step ST7 (step ST8) and then returns. The AF target face following processing will be described, hereinbelow. The AF target face following processing is processing to be executed by the follower processing portion 84 so that the face to be an AF target is not changed even when the photographer shifts the angle of view of the digital camera 1 by a small amount after the face to be an AF target is set by semi-depressing the shutter release button 19. With this arrangement, the face to be an AF target is not changed and the same face can be in focus even when there are a plurality of faces.

Figure 12A:
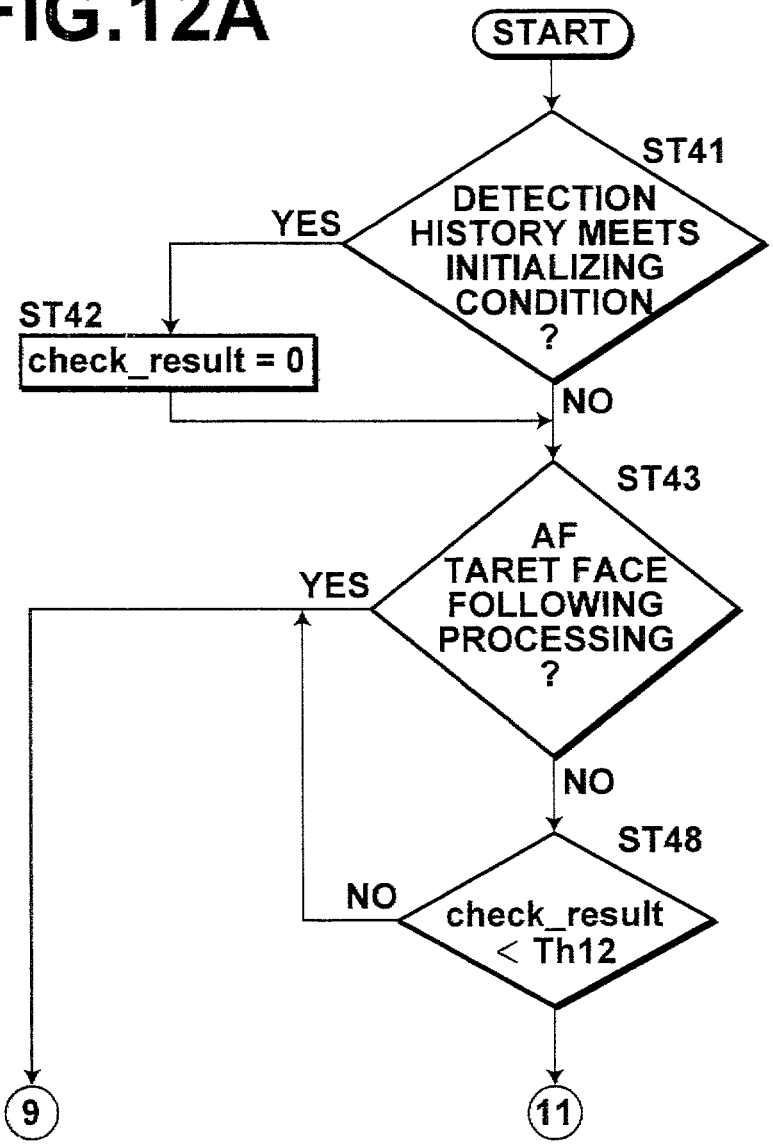

FIG. 12 shows a flowchart of the AF target face following processing. The AF target face following processing is repeated at predetermined time intervals. This predetermined time intervals may be or need not be the same as those for obtaining the through image.

The follower processing portion 84 first determines whether the digital camera 1 satisfies the condition under which the above said detection history is initialized (step ST41), and when step ST41 is affirmed, the follower processing portion 84 sets to 0 the check_result (step ST42). The check_result represents the number of times by which the AF target face following processing is repeated.

When step ST41 is denied and after step ST42, the follower processing portion 84 determines whether the setting is such that the digital camera 1 does dot execute the AF target face following processing (step ST43). When step ST43 is affirmed, that is, when the setting is such that the digital camera 1 does dot execute the AF target face following processing, the follower processing portion 84 proceeds to step ST55, where it increments the check_result, after the check_result is set to 0 (step ST44), information on the face selected as the AF target is cleared (AF target face information cleared: step ST45), AF priority face selection processing is effected (step ST46), and the selected face is set to a face of the AF target in the current AF target face following processing (step ST47) and then returns.

Since information on the face which has been selected as the AF target is added to the detection history, the face which has been selected as the AF target can be known by referring to the detection history. The AF priority face selection processing is for giving the priority order in which the faces are opposed to the AF to the faces determined to be handled as detected.

When step ST43 is denied, the follower processing portion 84 determines whether the check_result is smaller than a predetermined number of times Th12 (step ST48). When step ST48 is denied, the follower processing portion 84 proceeds to step ST44 in order to execute again the AF target face following processing. When step ST48 is affirmed, the AF target information in the preceding AF target face following processing is obtained by referring to the detection history. (step ST49) The AF target information is result of detection including the face which has been selected as the AF target in the detection history and information on the face. Then the follower processing portion 84 determines on the basis of the obtained AF target information whether there is a face to be linked with the face selected as the AF target in the preceding AF target face following processing toward the future. (step ST50)

For example, when face 1 of history [1] is the AF target, a correspondent face 0 is in history [0] toward the future as shown in FIG. 8C. In this case, step ST50 is affirmed. On the other hand, when face 2 of history [1] is the AF target, a correspondent face is not in history [0] toward the future. In this case, step ST50 is denied.

When step ST50 is denied, the follower processing portion 84 determines whether the face which was the AF target in the preceding AF target face following processing is determined to be handled as detected is determined (step ST51). When step ST51 is denied, the follower processing portion 84 proceeds to step ST44 in order to execute again the AF target face following processing. When step ST51 is affirmed, the face which was the AF target in the preceding AF target face following processing is employed as the AF target face in the current preceding AF target face following processing, (step ST52) and the processing proceeds to step ST55, where it increments the check_result, and returns.

When step ST50 is affirmed, the follower processing portion 84 determines by referring to the detection history whether the face with which the face which was the AF target in the preceding AF target face following processing is linked toward the future is handled as detected is determined (step ST53). When step ST53 is denied, the follower processing portion 84 proceeds to step ST44 in order to execute again the AF target face following processing. When step ST53 is affirmed, the follower processing portion 84 employs the face with which the face which was the AF target in the preceding AF target face following processing is linked toward the future as the AF target face in the current AF target face following processing (step ST54) and the processing proceeds to step ST55, where it increments the check_result, and returns.

For example, when face 1 of history [1] is the AF target, a correspondent face 0 is in history [0] toward the future as shown in FIG. 8C. This face 0 is handled as detected, and accordingly, face 0 is in history [0] is employed as the AF target face in the current AF target face following processing.

With this arrangement, the AF target face can be followed.

Figure 13A:
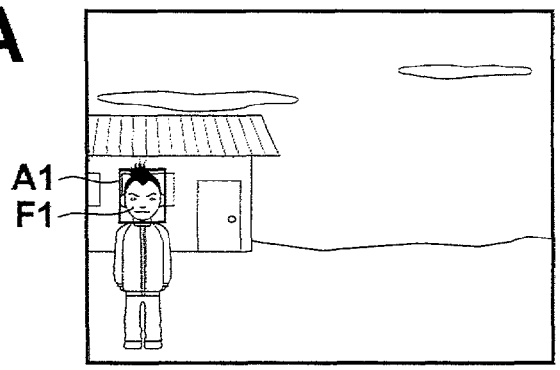
FIGS. 13A to 13C are views showing a through image when AF target face following processing.
Figure 13B:
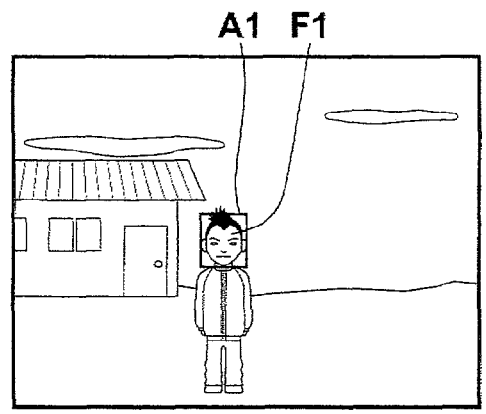
Figure 13C:
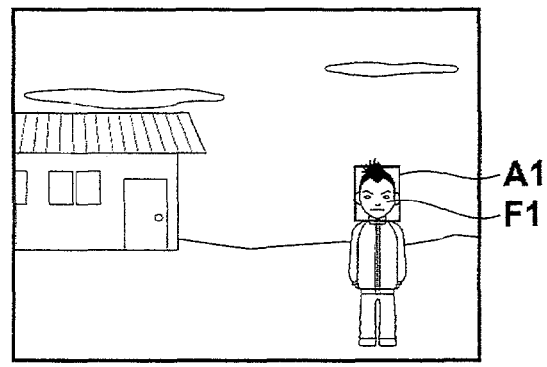

In the above described embodiment, it is preferred in displaying a through image on the monitor 18 that the AF target face be circumscribed with a detecting frame and when the face is followed by the AF target face following processing, also the detecting frame be displayed following the face. For example, when the face F1 which has been employed as the AF target in the field of view is moved to right from left for positioning upon image taking as shown in FIGS. 13A to 13C, it is preferred that the detecting frame A1 circumscribing the face be displayed following the movement of the face F1.

Figure 14:
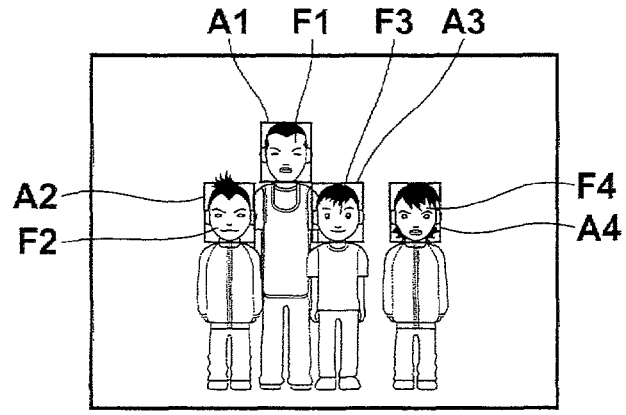
FIG. 14 is a view showing a through image attached with a detecting frame to the face determined to be handled as detected, and, FIGS. 15A to 15C are views showing a state where the detecting frame on the basis of the history and movement vectors is displayed on the liquid crystal monitor.

Further, not only the face employed as the AF target, all the faces F1 to F4 handled as detected may be circumscribed with a detecting frames A1 to A4 as shown in FIG. 14. In this case, the size and the position of the detecting frames are updated when the detection history is updated.

In the case where the AF target faces or the faces which are determined to be handled as detected are circumscribed with detecting frames when displayed, the size and the position of the detecting frames are changed when the detection history is updated since the size and the position of faces changes with movement of a person or change of the angle of field. However, if the size and the position of the detecting frames are changed with update of the detection history when the through image is displayed, the through image is rather hard to view.

In such a case, it is preferred that the size and the position of the face be smoothened referring to the detection history and the detecting frame be displayed according to the smoothened size and position of the face.

The smoothening processing is processing where the size and the position of the detecting frame are determined on the basis of the detection history and the AF target face or the face which is determined to be handled as detected. Specifically, investigating the AF target face or the face which is determined to be handled as detected in the destination of the link toward the past up to that a predetermined times before, the natural information of the face corresponding thereto in the result of detection of each times (orientation, inclination, size and the central position of the face) are extracted. Then, those which are in a predetermined range from the correspondent face in the difference of the natural information are extracted. In the case where there are extracted faces not less than a predetermined number in this stage, the faces of the largest size and the smallest size are removed, and the smoothening is carried out by the use of the remaining faces. When there are extracted faces less than a predetermined number, the smoothening is carried out by the use of all the faces.

By thus displaying the detecting frame by the use of the size and the position of the smoothened face, the size and the position of the detecting frames are prevented from being largely changed every time the detection history is updated and the through image is prevented from being hard to view.

Though the both being smoothened in the above embodiment, only one of the size and the position of the face may be smoothened.

Information on the size and the position of the smoothened face may be stored in the external recording medium 70 together with the image data of the running image obtained by the running image taking so that the information on the size and the position of the smoothened face is displayed in an reproduced image upon reproduction of image in the reproduction mode.

Though being a face in the embodiment described above, the predetermined objective body need not be limited to the face but may be an object other than the face.

Though, digital cameras in accordance with the embodiments of the present invention have been described, the program which causes a computer to function as a means corresponding to the face detecting portion 80, the determining portion 82 and the follower processing portion 84 and to execute processing such as shown in FIGS. 7 and 9 to 12 is also one of the embodiments of the present invention.

A computer readable recording medium on which such program is recorded is also one of the embodiments of the present invention.

What is claimed is:

1. An image displaying system comprising
an objective body detecting unit which detects a predetermined objective body from an image,
a storage unit which stores a detection history comprising a past result of detection of the predetermined objective body and a newest result of detection of the predetermined objective body, and
a determination unit which refers to the detection history and determines whether the predetermined objective body is to be handled as detected in the image obtained newest,
in which when the predetermined objective body has been detected not less than N times in the M times results of detection including the past results of detection (M≧N), the determination unit determines that the objective body is to be handled as detected in the image obtained newest.

2. The image displaying system as defined in claim 1 in which even when the predetermined objective body has not been detected not less than N times in the M times results of detection including the past results of detection, the determination unit determines that the predetermined objective body is to be handled as detected in the image obtained newest so long as the newest result of detection of the predetermined objective body meets predetermined conditions.

3. The image displaying system as defined in claim 1 in which when the predetermined objective body has been detected not less than N times in the M times results of detection including the past results of detection (M≧N), the determination unit determines that the predetermined objective body is to be handled as detected in the image obtained newest so long as the newest result of detection of the predetermined objective body meets certain conditions even if no predetermined objective body has been detected in the newest result of detection of the predetermined objective body.

4. The image displaying system as defined in claim 1 further comprising a selection holding unit which, when the predetermined objective body which has been determined to be the predetermined objective body to be handled as detected, and when the predetermined objective body in a new image corresponding to the selected predetermined objective body is detected, holds the selection of the predetermined objective body detected in the new image.

5. The image displaying system as defined in claim 1 in which the determination unit smoothens at least one of the position and the size of each of a plurality of predetermined objective bodies included in the detection history which are determined to be handled as detected and correspond to each other and outputs information according to the smoothened one of the position and the size.

6. An image displaying method comprising the steps of
detecting a predetermined objective body from an image,
storing a detection history comprising a past result of detection of the predetermined objective body and a newest result of detection of the predetermined objective body, and
determining whether the predetermined objective body is to be handled as detected in the image obtained newest by referring to the detection history,
in which when the predetermined objective body has been detected not less than N times in the M times results of detection including the past results of detection (M≧N), the determining step determines that the objective body is to be handled as detected in the image obtained newest.

7. A non-transitory computer readable recording medium on which is recorded a computer program for causing a computer to execute an image displaying method comprising the procedure of
detecting a predetermined objective body from an image,
storing a detection history comprising a past result of detection of the predetermined objective body and a newest result of detection of the predetermined objective body, and
determining whether the predetermined objective body is to be handled as detected in the image obtained newest by referring to the detection history,
in which when the predetermined objective body has been detected not less than N times in the M times results of detection including the past results of detection (M≧N), the determining step determines that the objective body is to be handled as detected in the image obtained newest.

* * * * *